(12) United States Patent
Johnson et al.

(10) Patent No.: US 6,884,315 B2
(45) Date of Patent: Apr. 26, 2005

(54) METHOD FOR BONDING DVD LAYERS

(75) Inventors: Morris A. Johnson, Smyrna, GA (US); Michael J. Idacavage, Smyrna, GA (US)

(73) Assignee: UCB, S.A., Brussels (BE)

( * ) Notice: Subject to any disclaimer, the term of this patent is extended or adjusted under 35 U.S.C. 154(b) by 162 days.

(21) Appl. No.: 10/223,638

(22) Filed: Aug. 20, 2002

(65) Prior Publication Data

US 2004/0038035 A1 Feb. 26, 2004

(51) Int. Cl.[7] .............................................. B32B 27/38
(52) U.S. Cl. ................ 156/330; 156/331.1; 156/272.2; 156/275.5; 156/275.7; 428/413; 428/414; 428/416; 428/64.1; 428/64.4; 428/65.2
(58) Field of Search ................................. 428/413, 414, 428/416, 64.1, 64.4, 65.2, 412; 156/330, 331.1, 272.2, 275.7, 275.5; 430/270.11, 495.1, 942

(56) References Cited

U.S. PATENT DOCUMENTS

| | | | |
|---|---|---|---|
| 5,445,855 A | 8/1995 | Tokita et al. | |
| 5,726,216 A | 3/1998 | Janke et al. | |
| 5,877,229 A | 3/1999 | Janke et al. | |
| 6,180,200 B1 | 1/2001 | Ha et al. | |
| 6,395,124 B1 * | 5/2002 | Oxman et al. | 156/275.5 |
| 2003/0165686 A1 * | 9/2003 | Blackburn et al. | 428/412 |

FOREIGN PATENT DOCUMENTS

| | | |
|---|---|---|
| EP | 0 827 974 | 3/1998 |
| EP | 1 136 533 | 9/2001 |

OTHER PUBLICATIONS

Database WPI, Section Ch, Week 199014, Derwent Publications Ltd., AN 1990–105485, XP002230074 & JP 02 058528 Mitsui Petrochem Ind. Co. Ltd. (1990)—Abstract.
A. Puzianowski et al., "Electron Beam Curable Epoxy Adhesives—A Synopsis of Recent Development Efforts", pp. 649–658 (CANCOM 01), Published Aug. 17, 2001.
Abstract, JP 11 315132, Nov. 11, 1999.
Abstract, JP 63148444, Jun. 21, 1998.
Abstract, JP 11315132, Feb. 27, 1990.
Abstract, JP 11315132A, Nov. 16, 1999, Dainippon Ink & Chem. Inc.
Abstract, JP 2058528 A, Feb. 27, 1990, Mitsui Petrochemicals.
Abstract, JP 63148444A, Jun. 21, 1988, Hitachi.
Puzianowski et al.; Electron Beam Curable Epoxy Adhesives—A Synopsis of Recent Development Efforts, Proceedings Canadian International Conferences Composites (CANCOM 2001), 649–656 (2001).

* cited by examiner

Primary Examiner—David J. Buttner
Assistant Examiner—Christopher Keehan
(74) Attorney, Agent, or Firm—Wenderoth, Lind & Ponack, LLP

(57) ABSTRACT

A method for bonding DVD layers which comprises EB bonding at least two layers of a DVD with an EB curable adhesive composition which consists essentially of at least one epoxy resin and at least one aryl iodonium salt (cationic) photoinitiator and DVDs produced by this method.

10 Claims, No Drawings

METHOD FOR BONDING DVD LAYERS

FIELD OF THE INVENTION

The present invention relates to a method of bonding DVD layers with an electron beam (EB) curable epoxy resin adhesive composition containing a cationic initiator.

BACKGROUND OF THE INVENTION

DVD manufacturing technology is relatively new and is rapidly evolving through a variety of different disc types, including two-sided discs.

A discussion of some recent attempts to produce DVDs appears in U.S. Pat. No. 6,180,200.

Adhesion of the DVD component disc layers, e.g. aluminum and polycarbonate disc layers has presented problems. For example, UV cure of adhesive requires line-of-sight exposure of the UV radiation, either directly on the adhesive or through various laminates.

Those laminates may consist of combinations of clear plastic and thin films of metal or thin films of metal coated onto the plastic. The UV radiation which reaches the adhesive through such a thin film of metal may be reduced to 0.1% of the original (free-radical (acrylate) processes sometimes use peroxide to overcome this problem), thus requiring a great excess of radiation be wasted, slowing the process, and further slowing total production line throughput, or requiring special procedures such as flash photolysis, or curing through the edge of the laminate.

Electron beam (EB) curable adhesives in combination with peroxide systems for DVD disc components are also known. With the appropriate EB processor accelerating voltage, discs can be cured through plastic, metal film, metal film coated on plastic, or a two-sided disc can be through-cured with one exposure. In contrast, it would be necessary for a UV-cured, two-sided disc of even the simplest design to be cured from both sides. EB processing allows the user to cure directly through all substrates (plastic, metal-coated plastic, paper, etc.) limited only by mass of substrate and accelerating voltage of the EB processor.

EB cationic cure is a simple process. Some UV systems, in order to achieve the requisite performance (adhesion, cure speed, etc.), require a hybrid process.

For example, U.S. Pat. No. 6,180,200 relates to such a hybrid method for bonding DVD disc layers through the use of a hybrid free radical and cationic pressure sensitive adhesive system to allow copolymerization of epoxy moieties with acrylate moieties. This hybrid system is said to have the cohesive strength of cationically cured resins combined with the fast cure and mild bonding characteristics of a pressure sensitive adhesive system (PSA). During cationic bonding, the discs are subjected to ultraviolet radiation. This system is said to have a faster cure rate than a cationic system alone. However the system is undesirably complex and difficult to control.

JP 11315132 discloses UV curable adhesives for DVDs, which adhesives contain glycidyl ether based epoxy resins and a photocationic polymerization initiator. This system has a chlorine concentration of 1 weight % or less. It suffers from the deficiencies of difficult process control associated with UV cure such as poor substrate penetration. In addition, the presence of chlorine may be hazardous and introduces an unnecessary degree of complexity to the manufacturing process.

JP 2058528 discloses a radiation curable composition for bonding optical disc components with an epoxy resin and a sulfonium salt. Organic peroxides and electron beam curing are employed. However, the organic peroxides tend to be unstable and process control is difficult.

It is an object of the present invention to overcome the above deficiencies of prior art DVD bonding methods.

SUMMARY OF THE INVENTION

The present invention using compositions consisting essentially of epoxy resins and aryl iodonium cationic initiators which are cured by EB radiation overcomes the foregoing deficiencies with UV and EB curable adhesive compositions and provides superior performance including superior adhesion, excellent resistance to moisture, and higher service temperatures than acrylates.

EB cationic adhesive DVD cure lends itself to very easy process control: 1) dosage is not affected by change in UV lamp output or dirty reflectors, and 2) line speed and EB power output are easily electronically slaved for excellent quality control and process flexibility (varying line speed for whatever reason).

DETAILED DESCRIPTION

The instant adhesive composition consists essentially of an epoxy resin and cationic photoinitiator. The DVD disc components are cured with (or under) suitable electron beam curing conditions detailed below.

Epoxy resins are well-known adhesives materials which can provide excellent mechanical performance, as well as excellent chemical resistance. Epoxy resins is a very broad class of materials. The ability to select epoxy resins for this particular adhesive application make for greater latitude and ease of formulation, including a broader choice of performance and cost parameters. See, e.g. U.S. Pat. Nos. 5,877, 229 and 5,726,216. The present invention now provides formulations with a wide range of physical properties, from low viscosity for spin coating to high viscosity for a hot-melt application process as well as toughened and untoughened resin systems, which may be desirable depending on performance requirements and cost parameters.

Acrylate adhesives have been known to have difficulty in achieving adhesion to certain difficult substrates such as non-porous metals and plastic surfaces. Epoxy adhesives are well known as excellent adhesives for a wide variety of substrates without the need for adhesion promoters. Further, epoxy adhesives are known to have excellent resistance to moisture. Further, epoxy adhesives are known to have generally higher service temperatures than acrylate adhesives.

Further, these materials generally provide low odor formulations with excellent thermal stability, stability to humidity, moisture, and other chemical attack.

No solvents, diluting monomers, or adhesion promoters (U.S. Pat. No. 5,445,855) are required. No copolymers have been shown to be necessary, e.g. such as ethylene/cycloolefin copolymer.

The cationic cure mechanism is not inhibited by the presence of oxygen in the process, whereas the free-radical process is inhibited by oxygen.

No materials such as peroxides (JP 2,058,528), chlorine (JP 11-315132), reactive diluents (U.S. Pat. No. 6,180,200), or free-radical initiators (U.S. Pat. No. 6,180,200) are required in the present process.

The present processes do not require the expensive and relatively hazardous peroxide additive, and such a system containing peroxide would not have the shelf stability of the present materials. Further, the present process does not require use of chlorine which may be hazardous and introduces an unnecessary degree of complexity to the manufacturing process. Further, the present process may use but does not require reactive diluents, which affords a more simple procedure.

Excellent laminate performance is readily achieved without the cumbersome two-step process of U.S. Pat. No. 6,180,200.

The epoxy resins employed herein include those of U.S. Pat. No. 5,877,229, incorporated by reference herein in its entirety.

Examples of suitable epoxy resins are as follows: glycidyl ethers of bisphenol A, epoxy novolacs, bisphenol F epoxies, tetraglycidyl ether of tetrakis (4-hydroxyphenyl) ethane, diglycidyl ether of 9,9-bis (4-hydroxyphenyl) fluorene, glycidyl ether of the condensation product of dicyclopentadiene and phenol, triglycidyl ether of tris (hydroxyphenyl) methane, 3',4'-epoxycyclohexylmethyl 3,4-epoxycyclohexanecarboxylate, diglycidyl ester of hexahydrophthalic anhydride, bis (3,4-epoxycyclohexylmethyl) adipate, isomeric mixture of bis (2,3-epoxycyclopentyl) ether reacted with ethylene glycol, isomeric mixture of bis (2,3-epoxycyclopentyl) ether blended with glycidyl ethers of bisphenol A, and mixtures thereof.

Further, as the cationic initiator, there is employed an aryl iodonium salt.

Suitable ones are disclosed, e.g. in U.S. Pat. No. 5,877,229 and EP 1,136,533, both incorporated by reference in their entirety herein, especially with respect to aryl iodonium salts.

Among suitable aryl iodonium salts are those having the following formula:

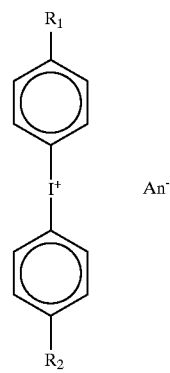

where $R_1$ and $R_2$ are selected from the group consisting of: H, methyl, ethyl, n-propyl, isopropyl, n-butyl, tert-butyl, Cl, Br, $OC_nH_{2n+1}$, $OCH_2CH(CH_3)C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, $OCH(CH_3)CO_2C_nH_{2n+1}$, $OCH(C_2H_5)CO_2C_nH_{2n+1}$, and mixtures thereof, where n is an integer between 0 and 18 and $An^-$ is an anion selected from the group consisting of: hexafluoroarsenate ($AsF_6^-$) hexafluoroantimonate ($SbF_6^-$) hexaflouro-phosphate ($PF_6^-$), boron tetrafluoride ($BF_4^-$) trifluoromethane sulfonate ($CF_3SO_3^-$), and tetrakis (pentafluorophenylborate) $(B[C_6F_5])_4^-$, and mixtures thereof or an anion selected from the group consisting of compounds having the following formula
$$[MR^3{}_aX_b]^-$$
wherein M is Al, Ga, In or Tl; $R^3$ are identical or different and represent a monovalent aromatic hydrocarbon radical having from 6 to 14 carbon atoms with at least one electron-withdrawing element or group such as $-CF_3$, $-NO_2$ or $-CN$, or with at least two halogen atoms; X is a halogen atom or hydroxyl group; a is 1, 2, 3 or 4; and b is 0, 1, 2 or 3; with the proviso that a+b=4.

There are many commercially available ones e.g. UVA-CURE® 1600 from UCB Chemicals Corp., Smyrna, Ga., having the above formula where $R_1$=H, $R_2$=O(CH$_2$)$_7$CH$_3$ and An=SbF$_6^-$.

The proportion of epoxy to cationic photoinitiator is 0.25 to 10 parts of cationic photoinitiator per hundred parts of epoxy resin, preferably 1.5 to 5 parts per hundred and more preferably 2 to 4 parts per hundred.

The DVD discs are cured by subjecting the adhesive bearing layers to EB dosages of from about 10 to 500 kGy, preferably about 50 to 150 kGy, to form crosslinked epoxy bonds.

Cure temperature is typically ambient and elevated temperature usually results from the exothermic cure.

The glycidyl ethers of various phenolic compounds are particularly important. These include the glycidyl ethers of bisphenol A as given by the following formula where n ranges from 0 to 12:

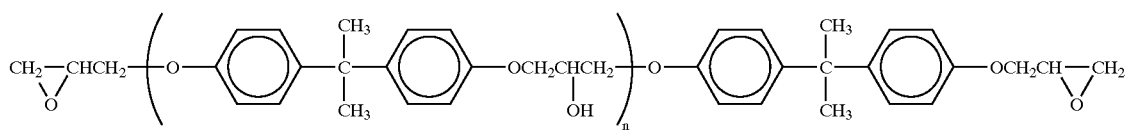

These resins are widely available from a number of manufacturers such as Shell Chemical Company, Dow Chemical Company, and Ciba-Geigy Corporation in a variety of molecular weights and viscosities. Examples include: D.E.R. 332, D.E.R. 330, D.E.R. 331, D.E.R. 383, TACTIX 123, TACTIX 138, and TACTIX 177 (DOW trademarks); EPON 825, EPON 826, and EPON 828 (Shell trademarks); and, ARALDITE GY 6008, ARALDITE GY 6010, and ARALDITE GY 2600 (Ciba-Geigy trademarks).

Another important class of glycidyl ethers are those of phenolic novolac and cresol novolac resins as given by the following formula wherein n ranges from 0 to 5:

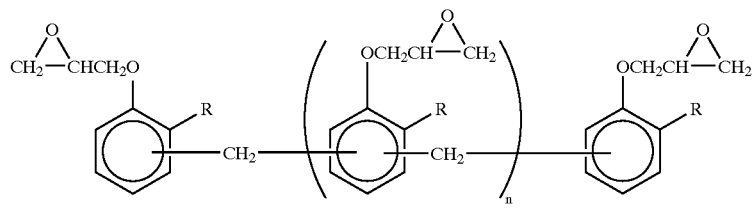

These materials are also widely available from a number of manufacturers in a variety of molecular weights and viscosities. Examples include EPON 862, EPON 155 (Shell trademarks); D.E.R. 354, D.E.N. 431, D.E.N. 438, and D.E.N. 439 (DOW trademarks); and ARALDITE PY 306, ARALDITE EPN 1139, ARALDITE EPN 1138, ARALDITE GY 281, ARALDITE GY 285, ARALDITE GY 302-2, ARALDITE LY 9703, ARALDITE XD 4955, and ARALDITE ECN 9511 (Ciba-Geigy trademarks).

Cycloaliphatic epoxies represent another group of epoxies useful in the present invention. They are usually low viscosity liquids at room temperature and can either be used alone or as reactive diluents in blends with the semi-solid glycidyl ether epoxies. These materials include 3'4'-epoxycyclohexylmethyl 3,4-epoxycyclohexanecarboxylate, which is available as Uvacure® 1500 (UCB Chemicals Corp.) and ARALDITE CY 179 (Ciba-Geigy); diglycidylester of hexahydrophthalic anhydride which is available as CY 184 (Ciba-Geigy); bis(3,4-epoxycyclohexylmethyl) adipate, which is available as ERL-4299 (Union Carbide); the isomeric mixture of bis (2,3-epoxycyclopentyl) ether, which was once available as ERL-4205 (Union Carbide), ERL-4205 reacted with ethylene glycol or blended with a bisphenol A based glycidyl ether, which were once available from Union Carbide as ERLB-4617 and ERL-2258 (Union Carbide), respectively.

Toughening agents may be employed to overcome the tendency of epoxy resins to be somewhat brittle. These may be added in concentrations ranging from 2 to 40% of the resin system. Toughening agents include elastomeric microspheres, thermoplastic such as polyarylene ethers, polysulfones and polyimides.

By the use of the cationic curing systems of the present invention, it is possible to obtain excellent cure properties, outstanding moisture resistance, long shelf life and environmentally satisfactory behavior.

Specific examples of the present invention now follow. However, these examples are in no way intended to limit the present invention.

EXAMPLES

1. A laminating adhesive consisting of a blend of 48.6 parts of Epon 828 (Shell), 48.6 parts of ERL 4205 (Union Carbide), and 2.8 parts of UVACURE® 1600 (UCB Chemicals) between two layers of polycarbonate film (GE Plastics) was cured in 4 passes with an electron beam accelerator at 10 MeV and 25 kGy per pass for a total EB dose of 100 kGy. The cured adhesive gave a bond which was sufficiently strong that laminating films could not be separated without tearing the substrate.
2. The laminating adhesive of Example 1 was modified by addition of 15 parts per hundred of Heloxy Modifier 63 (phenyl glycidyl ether from Resolution Performance Products) and EB cured as before. The cured adhesive gave a bond which tore the substrate.
3. The laminating adhesive of Example 1 was modified by addition of 15 parts per hundred of Erisys GE-7 (glycidyl ether of a naturally occurring $C_8$–$C_{10}$ aliphatic alcohol, EEW 220–235 from CVC Specialty Chemicals, Inc.) and EB cured as previously described to give a bond which tore the substrate.
4. The laminating adhesive of Example 1 was modified by addition of 15 parts per hundred of Placcel CD 210 (polycarbonate diol, MW-1000 from Daicel Chemical Industries) and EB cured as previously described to give a bond which tore the substrate.
5. The laminating adhesive of Example 1 was modified by addition of 15 parts per hundred of Stepanol PS 2002 ( about 200 OH number phthalic anhydride/diethyene glycol polyester-acid number 0.64 from Stepan Chemical Co.) and EB cured as previously described to give a bond which tore the substrate.
6. A laminating adhesive consisting of a blend of 48.5 parts of Tactix 123 (Resolution Performance Products), 38.9 parts of D.E.N. 438 (Dow), 9.7 parts of Udel P-1800 (polysulfone from Solvay Advanced Polymers), and 3.0 parts of CD 1012 (Sartomer) was compressed between polycarbonate sheets in a heated (120–130 deg. C.) press at 10,000 to 15,000 psi for 1–2 minutes. The laminate was then EB cured as previously described to give a bond which tore the substrate.
7. The laminating adhesive of Example 6 was modified by addition of 15 parts per hundred of Heloxy Modifier 63 and adhesive and laminate were processed as previously described with heat, pressure, and EB irradiation to give a bond which tore the substrate.
8. The laminating adhesive of Example 6 was modified by addition of 15 parts per hundred of Erisys GE-7 and adhesive and laminate were processed as previously described with heat, pressure, and EB irradiation to give a bond which tore the substrate.
9. The laminating adhesive of Example 6 was modified by addition of 15 parts per hundred of Stepanol PS 2002 and adhesive and substrate were processed as previously described with heat, pressure, and EB irradiation to give a bond which tore the substrate.
10. The laminating adhesive of Example 6 was modified by addition of 15 parts per hundred of Placcel CD 210 and adhesive and substrate were processed as previously described with heat, pressure, and EB irradiation to give a bond which tore the substrate.

In all examples, satisfactory DVD bonding was realized.

What is claimed is:

1. A method for bonding DVD layers which comprises EB (electron beam) bonding at least two layers of a DVD with an EB curable adhesive composition which consists essentially of at least one epoxy resin and at least one aryl iodonium salt (cationic) photoinitiator, and optionally, a toughening agent.

2. The method according to claim 1 wherein said aryl iodonium salt is a diaryl iodonium salt having has the following formula:

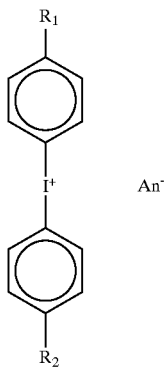

where $R_1$ and $R_2$ are selected from the group consisting of: H, methyl, ethyl, n-propyl, isopropyl, n-butyl, tert-butyl, Cl, Br, $OC_nH_{2n+1}$, $OCH_2CH(CH_3)C_nH_{2n+1}$, $OCH_2CH(C_2H_5)$, $OC_nH_{2n+1}$, $OCH_2CH(OH)C_nH_{2n+1}$, $OCH_2CO_2C_nH_{2n+1}$, $OCH_2(CH_3)CO_2C_nH_{2n+1}$, $OCH(C_2H_5)CO_2C_nH_{2n+1}$, and mixtures thereof, where n is an integer between 0 and 18 and $An^-$ is an anion selected from the group consisting of: hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($B[C_6F_5]_4^-$), and mixtures thereof or an anion selected from the group consisting of compounds having the following formula $$[MR^3{}_aX_b]^-$$

wherein M is Al, Ca, In or Tl; $R^3$ are identical or different and represent a monovalent aromatic hydrocarbon radical having from 6 to 14 carbon atoms with at least one electron-withdrawing element or —$CF_3$, —$NO_2$ or —CN, or with at least two halogen atoms; X is a halogen atom or hydroxyl group; a is 1, 2, 3 or 4; and b is 0, 1, 2 or 3; with the proviso that a+b=4.

3. The method according to claim 1, wherein said epoxy resin is selected from the group consisting of: glycidyl ethers of bisphenol A, epoxy novolacs, bisphenol F epoxies, tetraglycidyl ether of tetrakis (4-hydroxyphenyl) ethane, diglycidyl ether of 9,9-bis (4-hydroxyphenyl) fluorene, glycidyl ether of the condensation product of dicyclopenadiene and phenol, triglycidyl ether of tris (hydroxyphenyl) methane, 3',4'-epoxycyclohexylmethyl 3,4-epoxycyclohexanecarboxylate, diglycidyl ester of hexahydrophathalic anhydride, bis (3,4-epoxycyclohexylmethyl) adipate, isomeric mixture of bis (2,3-epoxycyclopentyl) ether reacted with ethylene glycol, isomeric mixture of bis (2,3-epoxycyclopentyl) ether blended with glycidyl ethers of bisphenol A, and mixtures thereof.

4. The method according to claim 3 wherein said epoxy resin is a glycidyl ether of bisphenol A.

5. The method according to claim 3 wherein said epoxy novolac is an epoxy phenolic novolac or an epoxy cresol novolac.

6. The method according to claim 1 wherein the adhesive composition is bonded with electron beams in a dosage of from about 10 to 500 kGy.

7. The method according to claim 1 wherein the DVD layers to be bonded are polycarbonate or one polycarbonate layer and one metal layer.

8. The method according to claim 1 wherein the DVD layers to be bonded are at least polycarbonate.

9. The method according to claim 7 wherein the metal layer is selected from the group consisting of Al, Ag and Au and alloys thereof.

10. The method according to claim 1 wherein the aryl iodonium salt is employed in an amount of 0.25 to 10 parts per hundred parts of epoxy resin.

* * * * *